US010265784B2

(12) United States Patent
Kuroda

(10) Patent No.: US 10,265,784 B2
(45) Date of Patent: Apr. 23, 2019

(54) BALL END MILL

(71) Applicant: KYOCERA Corporation, Kyoto-shi, Kyoto (JP)

(72) Inventor: Masahiko Kuroda, Higashiomi (JP)

(73) Assignee: KYOCERA Corporation, Kyoto-shi, Kyoto (JP)

( * ) Notice: Subject to any disclaimer, the term of this patent is extended or adjusted under 35 U.S.C. 154(b) by 114 days.

(21) Appl. No.: 14/415,740

(22) PCT Filed: Oct. 9, 2013

(86) PCT No.: PCT/JP2013/079257
§ 371 (c)(1),
(2) Date: Jan. 20, 2015

(87) PCT Pub. No.: WO2014/069453
PCT Pub. Date: May 8, 2014

(65) Prior Publication Data

US 2015/0224585 A1 Aug. 13, 2015

(30) Foreign Application Priority Data

Oct. 29, 2012 (JP) ................................ 2012-238087

(51) Int. Cl.
*B23C 5/10* (2006.01)

(52) U.S. Cl.
CPC .... *B23C 5/1009* (2013.01); *B23C 2210/0407* (2013.01); *B23C 2210/084* (2013.01); *Y10T 407/1948* (2015.01)

(58) Field of Classification Search
CPC ........... B23C 5/1009; B23C 2210/248; B23C 2210/0435; B23C 2210/0421; B23C 2210/084
See application file for complete search history.

(56) References Cited

U.S. PATENT DOCUMENTS 4,968,195 A * 11/1990 Hayakawa ............ B23C 5/1009 407/54
5,558,475 A * 9/1996 Hakansson ........... B23C 5/1009 407/119
6,684,742 B1 * 2/2004 White ....................... B23C 5/10 82/1.11
6,846,135 B2 * 1/2005 Kuroda ..................... B23C 5/10 407/34

(Continued)

FOREIGN PATENT DOCUMENTS

DE 3912631 C1 * 3/1990 ............... B23C 5/12
EP 0934788 A1 8/1999

(Continued)

OTHER PUBLICATIONS

International Search Report dated Dec. 26, 2013 in the corresponding International Application No. PCT/JP2013/079257.

(Continued)

*Primary Examiner* — Alan Snyder
(74) *Attorney, Agent, or Firm* — Viering, Jentschura & Partner MBB

(57) ABSTRACT

[Object] To provide a ball end mill in which it is possible to improve wear resistance in the vicinity of the central axis at the tip of a ball-nosed end cutting edge and to suppress vibration of a tool body during machining.
[Solution] A ball end mill 10 includes: a tool body 1 that rotates about a central axis O; and an arc-shaped ball-nosed end cutting edge 2 in a side view which is provided to start from the central axis O side on a tip side of the tool body 1 toward a rear side thereof. The ball-nosed end cutting edge 2 has a radius of curvature r that becomes gradually smaller from the central axis O side toward a periphery Q side.

16 Claims, 2 Drawing Sheets

(56) References Cited

U.S. PATENT DOCUMENTS

| | | | | | |
|---|---|---|---|---|---|
| 7,478,977 | B2 * | 1/2009 | Osawa | B23C 5/1009 | 407/42 |
| 7,618,219 | B2 * | 11/2009 | Osawa | B23C 5/1009 | 407/30 |
| 8,596,934 | B2 * | 12/2013 | Lehto | B23C 5/1009 | 407/113 |
| 8,690,492 | B2 * | 4/2014 | Azegami | B23C 5/1009 | 407/53 |
| 9,579,734 | B2 * | 2/2017 | Baba | B23C 5/10 | |
| 2005/0025584 | A1 | 2/2005 | Kolker et al. | | |
| 2006/0045639 | A1 | 3/2006 | Flynn et al. | | |
| 2011/0211922 | A1 * | 9/2011 | Maeda | B23C 5/1009 | 407/54 |

FOREIGN PATENT DOCUMENTS

| | | | | | |
|---|---|---|---|---|---|
| EP | 1935541 | A1 * | 6/2008 | B23C 5/1009 |
| JP | H1080816 | A | 3/1998 | |
| JP | 2001025912 | A * | 1/2001 | B23C 5/1009 |
| JP | 2004050338 | A * | 2/2004 | B23C 5/10 |
| JP | 2006015419 | A | 1/2006 | |
| JP | 2006224254 | A * | 8/2006 | B23C 5/10 |
| JP | 4407975 | B2 | 2/2010 | |
| JP | WO 2010050391 | A1 * | 5/2010 | B23C 5/1009 |
| JP | 2010214500 | A | 9/2010 | |
| JP | 2011212836 | A * | 10/2011 | B23C 5/10 |
| JP | 2012045705 | A | 3/2012 | |

OTHER PUBLICATIONS

European Search Report issued in the counterpart European Patent Application No. 13852126.5 dated Jun. 1, 2016, 6 pages.

Office Action issued in the counterpart Korean Patent Application No. 10-2014-7035703 dated Jul. 14, 2016, and a Concise Explanation thereof.

* cited by examiner

BALL END MILL

RELATED APPLICATIONS

The present application is a national stage entry according to 35 U.S.C. § 371 of PCT application No.: PCT/JP2013/079257 filed on Oct. 29, 2013 , which claims priority from Japanese application No.: 2012 -238087 filed on Oct. 29, 2012 , and is incorporated herein by reference in its entirety.

TECHNICAL FIELD

The present invention relates to a ball end mill.

BACKGROUND ART

A ball end mill is used for a machining process of, mainly, a die or the like. A cutting edge of the ball end mill on the tip side forms an arc in a side view. In general, such a ball-nosed end cutting edge on the tip side also forms an arc in an axial view of which a radius of curvature is constant from the inner peripheral portion to the outer peripheral portion. In addition, PTL 1 discloses a ball end mill that includes a first blade section on the inner peripheral side, a second blade section on the intermediate side, and a third blade section on the outer peripheral side of a ball-nosed end cutting edge, in which the radius of curvature of the second blade section is greater than the radius of curvature of the first blade section, and the radius of curvature of the third blade section is less than the radius of curvature of the second blade section, which enables high vibration-proof properties of an end mill body to be achieved.

CITATION LIST

Patent Literature

PTL 1: Japanese Patent No. 4407975

SUMMARY OF INVENTION

Technical Problem

However, under a machining condition of a high rotational speed under which accurate machining is performed, the ball end mill disclosed in PTL 1 rends a machined surface on the central axis side of the ball-nosed end cutting edge such that roughness of the machined surface deteriorates in some cases. In addition, high cutting resistance on the inner peripheral side of the ball-nosed end cutting edge brings about a high load on the ball-nosed end cutting edge such that vibration-proof properties of the end mill body deteriorate in some cases.

In order to solve the problems, the present invention provides a ball end mill of which wear resistance is high and performance of vibration-proof properties is improved even under a machining condition of a high rotational speed.

Solution to Problem

The present invention provides a ball end mill including: a tool body that rotates about a central axis; and an arc-shaped ball-nosed end cutting edge in a side view which is provided to start from the central axis side on a tip side of the tool body toward a rear side thereof. The ball-nosed end cutting edge has a radius of curvature that becomes gradually smaller from the central axis side toward a periphery side.

Advantageous Effects of Invention

According to the present invention, a ball end mill has a ball-nosed end cutting edge which has a radius of curvature that becomes gradually smaller from the central axis side toward a periphery side and, thereby, it is possible to suppress an increase in cutting resistance on an inner periphery side of the ball-nosed end cutting edge even under a machining condition of a high rotational speed such that it is possible to suppress deterioration of the roughness of a machined surface without rending of the machined surface and wear resistance of the ball-nosed end cutting edge is improved. In addition, since a light load is applied to the ball-nosed end cutting edge, the vibration-proof properties of the end mill body are improved.

BRIEF DESCRIPTION OF DRAWINGS

FIG. 1A is rotated by 90°.

DESCRIPTION OF EMBODIMENTS

A ball end mill according to the present invention is described with reference to FIGS. 1 to 3.

Figure 1A:
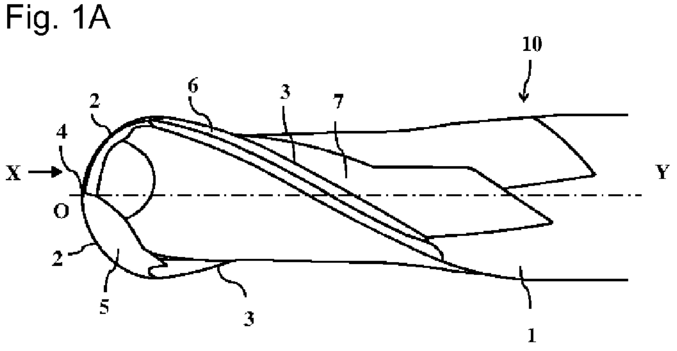
FIG. 1A is a schematic side view illustrating a ball end mill according to the present invention.
Figure 1B:
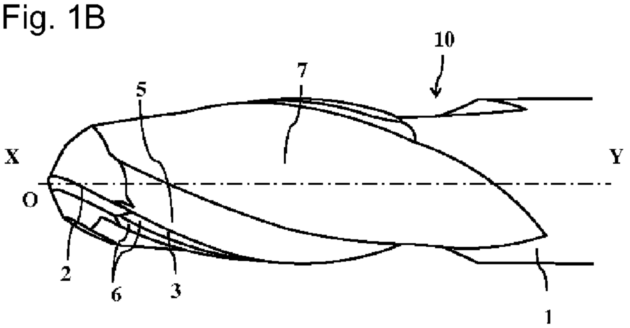
FIG. 1B is a schematic side view obtained when
Figure 2:
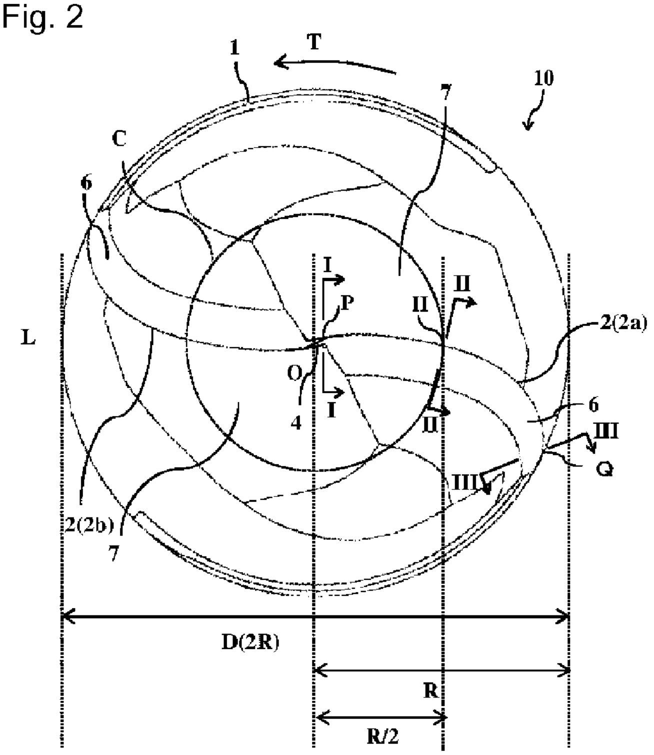
FIG. 2 is an axial view of the ball end mill illustrated in FIG. 1 when viewed from a tip X side.

A ball end mill (hereinafter, also simply referred to as an end mill) 10 in FIGS. 1 to 3 is a solid-type ball end mill and includes a tool body 1 that rotates about a central axis O; and an arc-shaped ball-nosed end cutting edge 2 in a side view which is provided to start from a tip (X) side of the tool body 1 toward a rear side thereof (toward a rear end (Y) side). The ball-nosed end cutting edge 2 is positioned on a periphery side from the central axis O side in an axial view along a direction from the tip (X) side toward the rear side (toward the rear end (Y) side). A rotational locus of the ball-nosed end cutting edge 2 is substantially a hemisphere. In FIG. 2, two ball-nosed end cutting edges 2 (2*a* and 2*b*) are provided and are disposed to be symmetrical about a point with respect to the central axis O to each other. In addition, an end gash is formed in the vicinity of the central axis O such that a chisel edge 4 is provided between the ball-nosed end cutting edges 2*a* and 2*b* which includes the central axis O.

The tool body 1 is substantially cylindrical on the rear side and the tool body 1 on the rear end (Y) side is mounted into a holder (not illustrated) so as to be attached to a cutting machine. In this way, the tool body 1 is rotated in a rotation direction T about the central axis O and can be used for a machining process of a die or the like.

The end mill 10 includes, in addition to the ball-nosed end cutting edge 2, a peripheral cutting edge 3 provided on the rear side of the ball-nosed end cutting edge 2, a rake face 5 provided in a rotation direction of the ball-nosed end cutting edge 2 and the peripheral cutting edge 3, a flank 6 provided in a counter-rotation direction of the ball-nosed end cutting edge 2 and the peripheral cutting edge 3, and a flute 7 that is continuous on the rear side of the rake face 5. The flute 7 is twisted toward the rear side in a reverse direction to the rotation direction T.

According to the present embodiment, the shape of the ball-nosed end cutting edge 2 is formed to have a radius of curvature that becomes gradually smaller from a point P (end position of the ball-nosed end cutting edge 2 on the central axis side) which is a boundary between the ball-nosed end cutting edge 2 and the chisel edge 4 on the central axis O side in an axial view in FIG. 2 toward a point Q that is positioned on the periphery. A radius of curvature r at each position of the ball-nosed end cutting edge 2 according to the present invention represents a radius of curvature of an arc that passes three points of a point of each position of the ball-nosed end cutting edge 2 and two points of the ball-nosed end cutting edge 2 that are positioned at a distance of 0.2 mm from the point of each position as the center. In addition, according to the present invention, measurement of the radius of curvature at each position of the ball-nosed end cutting edge 2 is performed to be spaced apart by a distance of 0.4 mm.

That is, even in a case where radiuses of curvature r of arcs drawn with respective points of the ball-nosed end cutting edge 2 as the centers are the same as each other, the radius of curvature r from the point P on the central axis O side toward the point Q positioned on the periphery is smaller when viewed at a locus of the ball-nosed end cutting edge 2 projected on an axial view in FIG. 2. However, according to the present embodiment, not only on the locus of the ball-nosed end cutting edge 2 projected on the axial view, but also in measuring a three-dimensional shape, the radius of curvature r of an arc drawn with each point of the ball-nosed end cutting edge 2 as the center becomes smaller from the point P on the central axis O side toward the point Q positioned on the periphery.

Accordingly, since it is possible to prevent the central axis O of the ball-nosed end cutting edge 2 from coming into excessive contact with a work material despite cutting under a machining condition of a high rotational speed, it is possible to suppress an increase in cutting resistance in the vicinity of the point P on the central axis O side of the ball-nosed end cutting edge 2. As a result, it is possible to suppress deterioration of the roughness of a machined surface without rending of the machined surface and wear resistance of the ball-nosed end cutting edge 2 is improved. In addition, since a load imposed on the ball-nosed end cutting edge 2 is small, it is possible to decrease vibration of the end mill body 1 due to an impact during the cutting process.

The radiuses of curvature r at the point P and the point Q which are ends of the ball-nosed end cutting edge 2 are obtained as a radius of curvature r of an arc that passes all three points of a terminal end of each of the point P and the point Q and two points positioned at distances of 0.2 mm and 0.4 mm from the terminal end of the ball-nosed end cutting edge 2. The radius of curvature is not illustrated in the drawings.

In addition, according to the present embodiment, the ratio of a radius of curvature $r_{P\text{-}H}$ of the ball-nosed end cutting edge 2 from the point P positioned at the end on the central axis O side of the ball-nosed end cutting edge 2 to an intersection point H with a circle (circle C in FIG. 2) with a radius of R/2 and with the central axis O of the ball-nosed end cutting edge 2 as the center to a diameter D (=2R) of the tool body 1 which corresponds to a cutting diameter of the end mill 10 is in a range of 0.8 to 2 and the ratio of a radius of curvature $r_{H\text{-}Q}$ of the ball-nosed end cutting edge 2 from the position H which is half of the radius R of the tool body 1 to the position Q on the periphery to the diameter D of the tool body 1 is in a range of 0.2 to 1.2. Accordingly, it is possible to satisfy the desired wear resistance of the ball-nosed end cutting edge 2 and the vibration-proof properties of the end mill body 1.

Further, according to the present embodiment, the ratio of a radius of curvature $r_P$ of the ball-nosed end cutting edge 2 at the point P which is the end position on the central axis O side to the diameter D of the tool body 1 is in a range of 1.5 to 2, the ratio of a radius of curvature $r_H$ of the ball-nosed end cutting edge 2 at the point H which is a position that is half of the radius R of the tool body 1 to the diameter D of the tool body 1 is in a range of 0.8 to 1.2, and the ratio of a radius of curvature $r_Q$ of the ball-nosed end cutting edge 2 at the point Q which is a position on the periphery to the diameter D of the tool body 1 is in a range of 0.2 to 0.6. Accordingly, it is possible to satisfy the desired wear resistance of the ball-nosed end cutting edge 2 and the vibration-proof properties of the end mill body 1.

Here, in terms of the gradual decrease in the radius of curvature r of the shape of the ball-nosed end cutting edge 2 from the point P toward the point Q, the radius of curvature r may be decreased in a stepwise manner or continuously decreased at a constant rate. According to the present embodiment, the radius of curvature r of the ball-nosed end cutting edge 2 from the point P on the central axis O side toward the point Q on the periphery is continuously decreased at a constant rate. Accordingly, since there is no point at which a significant change of a radius of curvature r of the ball-nosed end cutting edge 2 occurs from the central axis toward the periphery side, wear resistance of the entire ball-nosed end cutting edge 2 is improved without a local increase in the cutting resistance.

In addition, in an axial view of FIG. 2, two ball-nosed end cutting edges 2 are provided on the end mill 10; however, the number of the ball-nosed end cutting edges 2 is not limited to being two, and three or more ball-nosed end cutting edges may be provided. The shape of two ball-nosed end cutting edges 2 is effective in that chips produced during a process, in which a ball end mill having a small cutting diameter is used, are smoothly discharged. In addition, although not illustrated, it is possible to apply a configuration, to another embodiment, in which at least one ball-nosed end cutting edge has a different shape in an axial view from a shape of another ball-nosed end cutting edge in an axial view. Accordingly, at least one ball-nosed end cutting edge has an asymmetrical shape and, thus, it is possible to prevent a chatter mark form being produced due to sympathetic vibration of the end mill 10 during the cutting. An example of a configuration in which at least one ball-nosed end cutting edge has an asymmetric shape includes a configuration or the like in which the radius of curvature r of one ball-nosed end cutting edge is decreased in a stepwise manner in an axial view and the radius of curvature r of the other ball-nosed end cutting edge is continuously decreased in an axial view. The configuration in which one ball-nosed end cutting edge has a different shape from another in the axial view can be preferably employed in a case of having three or more cutting edges.

Figure 3A:
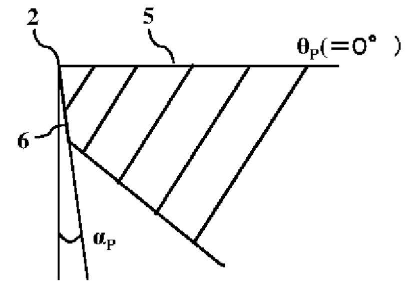
FIG. 3A is a cross-sectional view (cross-sectional view taken along line I-I) at a point P of the ball-nosed end cutting edge in the ball end mill illustrated in FIG. 2.
Figure 3B:
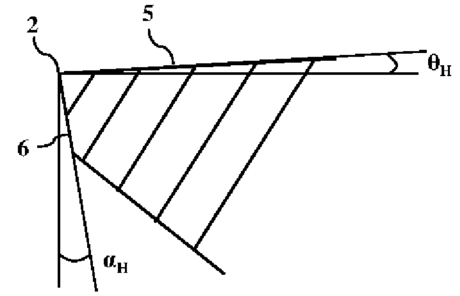
FIG. 3B is a cross-sectional view (cross-sectional view taken along line II-II) at a point H of the ball-nosed end cutting edge in the ball end mill illustrated in FIG. 2.
Figure 3C:
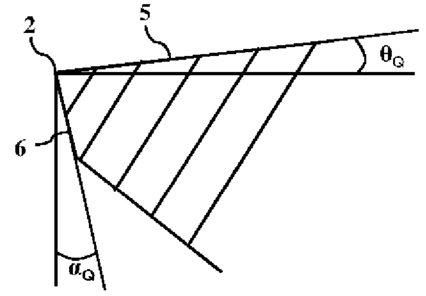
FIG. 3C is a cross-sectional view (cross-sectional view taken along line at a point Q of the ball-nosed end cutting edge in the ball end mill illustrated in FIG. 2.

Here, according to the present embodiment, the ball-nosed end cutting edge 2 has a rake angle of 0° to −20°. That is, the rake angle θ of the ball-nosed end cutting edge 2 is zero or a so-called negative rake angle. Further, according to the present embodiment, as illustrated in a cross-sectional view in FIGS. 3A to 3C showing points P, H, and Q of the ball-nosed end cutting edge 2, a negative value of a rake angle increases from the central axis O side toward the periphery side. That is, the negative value of the rake angle θ increases in an order of a rake angle $\theta_P$ at the point P, a rake angle $\theta_H$ at the point H, and a rake angle $\theta_Q$ at the point Q, such that the rake face 5 rises as the rake face becomes distant from the ball-nosed end cutting edge 2.

Accordingly, strength of the ball-nosed end cutting edge 2 is secured and it is possible to suppress partial damage to the ball-nosed end cutting edge 2. That is, since the radius of curvature of the ball-nosed end cutting edge 2 is small on the periphery side, the ball-nosed end cutting edge 2 has a protruding shape and is likely to be weak in strength. In addition, since the cutting is performed at a high cutting rate on the periphery side, wear rapidly progresses. Meanwhile, since the cutting rate is nearly zero on the central axis O side, the cutting resistance is likely to increase. Therefore, the negative value of the rake angle θ increases from the central axis O side toward the periphery side and, thereby it is possible to suppress chipping of or partial damage to the ball-nosed end cutting edge 2 on the periphery side. Simultaneously, the cutting resistance on the central axis O side becomes small and the machined surface is prevented from being rough.

EXAMPLE 1

Using the ball end mill shape schematically illustrated in FIGS. 1A, 1B, and 2, ball end mills of Specimen No. 1 to 10 were prepared, of which radiuses of curvature $r_P$, $r_H$, and $r_Q$ at positions of point P (central axis side), point Q (periphery), and point H (half of the radius) with respect to a curved shape of the ball-nosed end cutting edge and the diameter of the tool body, ratios $r_P/D$, $r_H/D$, and $r_Q/D$ of the radiuses of curvature to the diameter (D), rake angles $\theta_P$, $\theta_H$, and $\theta_Q$, flank angles $\alpha_P$, $\alpha_H$, and $\alpha_Q$ has dimensions shown in Table 1 and the cutting process was evaluated under the following conditions. Table 2 shows the results. Two ball-nosed end cutting edges of the end mill were used and a diameter (cutting diameter D=2R) of the tool body was 6 mm.

(Cutting Conditions)

Work Material: HPM 38 steel
Processing Diameter: ϕ6 mm
Processing Rate: 220 m/min
Rotational Speed: 11,700 rpm
Feeding: 0.058 mm/edge
Cutting Depth: 0.6 mm×0.3 mm
Cutting Form: Shoulder Milling
Cutting Environment: Dry Cutting
Evaluation Items: The maximum amount of wear and roughness of the machined surface (maximum height) in a state of viewing the ball-nosed end cutting edge in an axial view, at the time of a cutting process of a length of 100 m.

TABLE 1

| | Ball-nosed End Cutting Edge (mm) | | | | | | | Rake Angle (°) | | | Flank Angle (°) | | |
|---|---|---|---|---|---|---|---|---|---|---|---|---|---|
| Specimen No. | $r_P$ | $r_H$ | $r_Q$ | $r_P/D$ | $r_H/D$ | $r_Q/D$ | Curved Line Shape | $\theta_P$ | $\theta_H$ | $\theta_Q$ | $\alpha_P$ | $\alpha_H$ | $\alpha_Q$ |
| 1 | 4.8 | 4.8 | 4.8 | 0.8 | 0.8 | 0.8 | No Change | 0 | −2 | −12 | 12 | 13 | 15 |
| 2 | 9.0 | 4.8 | 3.6 | 1.5 | 0.8 | 0.6 | Deformation in Three Steps | 0 | −2 | −12 | 12 | 13 | 15 |
| 3 | 4.2 | 3.0 | 1.2 | 0.7 | 0.5 | 0.2 | Continuous Deformation | 0 | −2 | −12 | 12 | 13 | 15 |
| 4 | 12.0 | 4.8 | 1.2 | 2 | 0.8 | 0.2 | Continuous Deformation | 0 | −2 | −12 | 12 | 13 | 15 |
| 5 | 18.0 | 12.0 | 7.2 | 3 | 2.0 | 1.2 | Continuous Deformation | 0 | 0 | −12 | 12 | 13 | 15 |
| 6 | 2.4 | 7.2 | 1.8 | 0.4 | 1.2 | 0.3 | Deformation in Three Steps | 0 | 0 | −12 | 12 | 13 | 15 |
| 7 | 10.8 | 10.8 | 3.6 | 1.8 | 1.8 | 0.6 | Deformation in Two Steps | 0 | 0 | −12 | 12 | 13 | 15 |
| 8 | 12.0 | 4.8 | 1.2 | 2 | 0.8 | 0.2 | Continuous Deformation | 0 | 0 | 0 | 12 | 13 | 15 |
| 9 | 12.0 | 4.8 | 1.2 | 2 | 0.8 | 0.2 | Continuous Deformation | −1 | −10 | −20 | 12 | 13 | 15 |
| 10 | 12.0 | 4.8 | 1.2 | 2 | 0.8 | 0.2 | Continuous Deformation | 0 | −2 | −12 | 12 | 12 | 12 |

According to the present embodiment, the rake angle $\theta_P$ at the point P on the central axis O side is 0° to −1°, the rake angle $\theta_H$ of the ball-nosed end cutting edge 2 at the intermediate point H is −1° to −5°, and the rake angle $\theta_Q$ of the ball-nosed end cutting edge 2 at the point Q on the periphery is −10° to −20°.

In addition, according to the present embodiment, as illustrated in FIGS. 3A to 3C, a flank angle α of the ball-nosed end cutting edge 2 increases from the central axis O side toward the periphery side. That is, the flank angle α increases in an order of a flank angle $\alpha_P$ at the point P, a flank angle $\alpha_H$ at the point H, and a flank angle $\alpha_Q$ at the point Q.

According to the present embodiment described above, the so-called solid-type configuration in which the cutting edges are formed on predetermined portions of the tool body 1 itself as illustrated in FIGS. 1A, 1B, and 2 is described; however, instead, a so-called throw-away type configuration in which a so-called throw-away tip is mounted into a holder may be employed.

TABLE 2

| Specimen No. | Maximum Width of Wear (mm) | Roughness of Machined Surface Rz (μm) |
|---|---|---|
| 1 | 0.060 | 4.36 |
| 2 | 0.057 | 2.68 |
| 3 | 0.050 | 2.60 |
| 4 | 0.040 | 1.85 |
| 5 | 0.058 | 3.87 |
| 6 | 0.062 | 5.65 |
| 7 | 0.058 | 2.89 |
| 8 | 0.056 | 3.25 |
| 9 | 0.052 | 3.31 |
| 10 | 0.051 | 3.15 |

As clear in the results in Tables 1 and 2, using Specimen No. 1 that had the same radius of curvature of the ball-nosed end cutting edge from the central axis side to the periphery side, great vibration was produced in the tool body and the roughness of the machined surface deteriorated. In addition, using Specimen No. 6 that had a greater radius of curvature of the ball-nosed end cutting edge at an intermediate position between the central axis side and the periphery side, rending on the machined surface occurred, the roughness of the machined surface deteriorated, and a great amount of wear occurred.

On the other hand, using Specimens No. 2 to 5 and 7 to 10 in accordance with the present invention, in which the radius of curvature of the ball-nosed end cutting edge is gradually decreased from the central axis side toward the periphery side, low vibration was produced in the tool body and roughness of the machined surface was low.

EXAMPLE 2

A ball end mill was prepared to have three cutting edges and a tool body with a diameter (cutting diameter D) of 6 mm, and the three cutting edges all having the same shapes as Specimen No. 4 in Example 1 (Specimen No. 11). Similarly, a ball nose end mill was prepared to have three cutting edges and a tool body with a diameter (cutting diameter D=2R) of 6 mm, and the two cutting edges having the same shapes as Specimen No. 4 in Example 1 and one cutting edge having the same shape as Specimen No. 2 (Specimen No. 12). Evaluation of a cutting process was performed on Specimens Nos. 11 and 12 under the same conditions as in Example 1. Regarding the maximum amount of wear at the time of the cutting process of a cutting length of 100 m in a state of viewing the ball-nosed end cutting edge in an axial view, Specimen No. 11 had 0.050 mm and Specimen No. 12 had 0.047 mm, and regarding the roughness (maximum height) of the machined surface, Specimen No. 11 had 2.02 μm and Specimen No. 12 had 1.34 μm.

REFERENCE SIGNS LIST

1 TOOL BODY
2 BALL-NOSED END CUTTING EDGE
3 PERIPHERAL CUTTING EDGE
4 CHISEL EDGE
5 RAKE FACE
6 FLANK
7 FLUTE
10 END MILL
X TIP
Y REAR END
O CENTRAL AXIS
P END ON THE CENTRAL AXIS SIDE OF THE BALL-NOSED END CUTTING EDGE
Q END ON THE PERIPHERY SIDE OF THE BALL-NOSED END CUTTING EDGE
H INTERMEDIATE POSITION OF THE BALL-NOSED END CUTTING EDGE
T ROTATION DIRECTION

What is claimed is:

1. A ball end mill comprising:

a tool body comprising a front end and a rear end and extending along a central axis; and a cutting edge having an arc-shape in a side view, and comprising a first end located at a side of the front end thereof and a second end located at a side of the rear end thereof; wherein a radius of curvature of the cutting edge becomes gradually smaller continuously from the first end to the second end;

the cutting edge further comprises a middle point where a circle with a radius of R/2 and with the central axis intersects the cutting edge when a radius of the tool body is R; and a ratio of a radius of curvature of the cutting edge from the first end to the middle point to a diameter of the tool body is in a range of 0.8 to 2 and a ratio of a radius of curvature of the cutting edge from the middle point to the second end to the diameter of the tool body is in a range of 0.2 to 1.2.

2. The ball end mill according to claim 1, wherein the radius of curvature of the cutting edge from the first end to the second end is continuously decreased at a constant rate.

3. The ball end mill according to claim 1, wherein the cutting edge has a rake angle of 0° to −20° and a negative value of the rake angle increases from the first end to the second end.

4. The ball end mill according to claim 1, wherein a radius of curvature of the cutting edge becomes smaller from the first end to the second end in measuring a three-dimensional shape.

5. The ball end mill according to claim 1, wherein the cutting edge further comprises a middle point where a circle with a radius of R/2 and with the central axis intersects the cutting edge when a radius of the tool body is R and wherein, in an axial view, when a rake angle at the first end is $\theta_P$, when a rake angle at the middle point is $\theta_H$, when a rake angle at the second end is $\theta_Q$, it satisfies $|\theta_P|<|\theta_H|<|\theta_Q|$.

6. The ball end mill according to claim 1, wherein the cutting edge further comprises a middle point where a circle with a radius of R/2 and with the central axis intersects the cutting edge when a radius of the tool body is R, and wherein, in an axial view, when a flank angle at the first end is $\alpha_P$, when a flank angle at the middle point is $\alpha_H$, when a flank angle at the second end position is $\alpha_Q$, it satisfies $|\alpha_P|<|\alpha_H|<|\alpha_Q|$.

7. The ball end mill according to claim 1, wherein a radius of curvature of the cutting edge becomes gradually smaller from the first end toward the second end in a front view.

8. A ball end mill comprising:

a tool body comprising a front end and a rear end and extending along a central axis; and a cutting edge having an arc-shape in a side view, and comprising a first end located at a side of the front end thereof, a second end located at a side of the rear end thereof, and a middle point where a circle with a radius of R/2 and with the central axis intersects the cutting edge when a radius of the tool body is R;

wherein when a radius of curvature at the first end is r1, when a radius of curvature at the second end is r2, when a radius of curvature at the middle point is r3, it satisfies r2<r3<r1;

a ratio of a radius of curvature of the cutting edge at the first end to a diameter of the tool body is in a range of 1.5 to 2, the ratio of a radius of curvature of the cutting edge at the middle point to the diameter of the tool body is in a range of 0.8 to 1.2, and a ratio of a radius of curvature of the cutting edge at the second end to the diameter of the tool body is in a range of 0.2 to 0.6.

9. The ball end mill according to claim 8, wherein the radius of curvature of the cutting edge from the first end to the second end is continuously decreased at a constant rate.

10. The ball end mill according to claim 8, wherein the cutting edge has a rake angle of 0° to −20° and a negative value of the rake angle increases from the first end to the second end.

11. The ball end mill according to claim 8, wherein a radius of curvature of the cutting edge becomes smaller from the first end to the second end in measuring a three-dimensional shape.

12. The ball end mill according to claim 8, wherein, in an axial view, when a rake angle at the first end is $\theta_p$, when a rake angle at the middle point is $\theta_H$, when a rake angle at the second end is $\theta_Q$, it satisfies $|\theta_p|<|\theta_H|<|\theta_Q|$.

13. The ball end mill according to claim 8, wherein the cutting edge further comprises a middle point where a circle with a radius of R/2 and with the central axis intersects the cutting edge when a radius of the tool body is R, and wherein, in an axial view, when a flank angle at the first end is $\alpha_p$, when a flank angle at the middle point is $\alpha_H$, when a flank angle at the second end position is $\alpha_Q$, it satisfies $|\alpha_p|<|\alpha_H|<|\alpha_Q|$.

14. The ball end mill according to claim 8, wherein a radius of curvature of the cutting edge becomes gradually smaller from the first end toward the second end in a front view.

15. A ball end mill comprising:

a tool body comprising a front end and a rear end and extending along a central axis; and a cutting edge having an arc-shape in a side view, and comprising a first end located at a side of the front end thereof and a second end located at a side of the rear end thereof; wherein a radius of curvature of the cutting edge becomes gradually smaller continuously from the first end to the second end;

a ratio of a radius of curvature of the cutting edge at the first end to a diameter of the tool body is in a range of 1.5 to 2, the ratio of a radius of curvature of the cutting edge at a middle point to the diameter of the tool body is in a range of 0.8 to 1.2, and a ratio of a radius of curvature of the cutting edge at the second end to the diameter of the tool body is in a range of 0.2 to 0.6.

16. A ball end mill comprising:

a tool body comprising a front end and a rear end and extending along a central axis; and a cutting edge having an arc-shape in a side view, and comprising a first end located at a side of the front end thereof, a second end located at a side of the rear end thereof, and a middle point where a circle with a radius of R/2 and with the central axis intersects the cutting edge when a radius of the tool body is R;

wherein when a radius of curvature at the first end is r1, when a radius of curvature at the second end is r2, when a radius of curvature at the middle point is r3, it satisfies r2<r3<r1; and a ratio of a radius of curvature of the cutting edge from the first end to the middle point to a diameter of the tool body is in a range of 0.8 to 2 and a ratio of a radius of curvature of the cutting edge from the middle point to the second end to the diameter of the tool body is in a range of 0.2 to 1.2.

* * * * *